United States Patent

Yamamoto et al.

(10) Patent No.: US 10,490,194 B2
(45) Date of Patent: Nov. 26, 2019

(54) SPEECH PROCESSING APPARATUS, SPEECH PROCESSING METHOD AND COMPUTER-READABLE MEDIUM

(71) Applicant: NEC Corporation, Tokyo (JP)

(72) Inventors: Hitoshi Yamamoto, Tokyo (JP); Takafumi Koshinaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/873,441

(22) Filed: Oct. 2, 2015

(65) Prior Publication Data
US 2016/0098993 A1    Apr. 7, 2016

(30) Foreign Application Priority Data
Oct. 3, 2014 (JP) ................. 2014-204585

(51) Int. Cl.
*G10L 15/00* (2013.01)
*G10L 15/20* (2006.01)
(Continued)

(52) U.S. Cl.
CPC ............ *G10L 17/02* (2013.01); *G10L 15/075* (2013.01); *G10L 25/30* (2013.01); *G10L 25/63* (2013.01)

(58) Field of Classification Search
CPC ................ G06F 17/2725; G06F 21/32; G06F 17/30598; G06F 21/44; G06F 21/45;
(Continued)

(56) References Cited

U.S. PATENT DOCUMENTS 5,121,428 A * 6/1992 Uchiyama ............... G10L 17/02
704/243
5,361,324 A * 11/1994 Takizawa ................ G10L 15/20
704/209
(Continued)

FOREIGN PATENT DOCUMENTS

JP    H3-206499 A    9/1991
JP    2007-156422    6/2007
(Continued)

OTHER PUBLICATIONS

"Front-End Factor Analysis for Speaker Verification" by Najim Dehak, Patrick J. Kenny, Reda Dehak, Pierre Dumouchel, and Pierre Ouellet in IEEE Transactions on Audio, Speech and Language Processing, vol. 19, No. 4, pp. 788-798, 2011.*
(Continued)

*Primary Examiner* — Michael Ortiz-Sanchez
(74) *Attorney, Agent, or Firm* — Finnegan, Henderson, Farabow, Garrett & Dunner, L.L.P.

(57) ABSTRACT

A speech processing apparatus, method and non-transitory computer-readable storage medium are disclosed. A speech processing apparatus may include a memory storing instructions, and at least one processor configured to process the instructions to calculate an acoustic diversity degree value representing a degree of variation in types of sounds included in a speech signal representing a speech, on a basis of the speech signal, and compensate for a recognition feature value calculated to recognize specific attribute information from the speech signal, using the acoustic diversity degree value.

21 Claims, 5 Drawing Sheets

(51) Int. Cl.
*G10L 17/00* (2013.01)
*G10L 15/06* (2013.01)
*G10L 17/02* (2013.01)
*G10L 15/07* (2013.01)
*G10L 25/30* (2013.01)
*G10L 25/63* (2013.01)

(58) Field of Classification Search
CPC ... G06F 17/30743; G06N 5/047; G10L 15/22;
G10L 15/04; G10L 15/10; G10L 17/04;
G10L 15/02; G10L 17/005; G10L 17/02;
G10L 17/06; G10L 15/01; G10L 15/07;
G10L 15/08; G10L 25/03; G10L 25/63;
G10L 15/26; G10L 25/51; G10L 17/16;
G10L 25/84; G10L 15/20; G10L 25/60;
G10L 21/0272; G10L 25/48; G10L 25/81;
G10L 15/14; G10L 15/142; G10L 15/265;
G10L 17/20; G10L 15/075; G10L 25/30;
G10L 17/26; H04M 2250/74
See application file for complete search history.

(56) References Cited

U.S. PATENT DOCUMENTS

| | | | | |
|---|---|---|---|---|
| 5,893,057 A * | 4/1999 | Fujimoto | | G10L 17/00 |
| | | | | 704/246 |
| 5,960,397 A * | 9/1999 | Rahim | | G10L 15/20 |
| | | | | 704/233 |
| 6,119,084 A * | 9/2000 | Roberts | | G10L 17/20 |
| | | | | 704/243 |
| 6,691,091 B1 * | 2/2004 | Cerisara | | G10L 15/063 |
| | | | | 704/244 |
| 6,697,779 B1 * | 2/2004 | Bellegarda | | G10L 17/04 |
| | | | | 704/246 |
| 7,289,957 B1 * | 10/2007 | Grashey | | G10L 17/24 |
| | | | | 704/246 |
| 7,340,397 B2 * | 3/2008 | Fado | | G10L 15/02 |
| | | | | 704/226 |
| 8,428,944 B2 * | 4/2013 | Poultney | | G10L 15/07 |
| | | | | 704/231 |
| 2002/0010587 A1 * | 1/2002 | Pertrushin | | G10L 17/26 |
| | | | | 704/275 |
| 2002/0165712 A1 * | 11/2002 | Souilmi | | G10L 15/063 |
| | | | | 704/233 |
| 2004/0176952 A1 * | 9/2004 | Fado | | G10L 15/02 |
| | | | | 704/233 |
| 2004/0199384 A1 * | 10/2004 | Hong | | G10L 15/063 |
| | | | | 704/233 |
| 2006/0111904 A1 * | 5/2006 | Wasserblat | | G10L 17/00 |
| | | | | 704/246 |
| 2007/0294083 A1 * | 12/2007 | Bellegarda | | G10L 17/04 |
| | | | | 704/250 |
| 2008/0195387 A1 * | 8/2008 | Zigel | | G10L 17/06 |
| | | | | 704/236 |
| 2009/0119103 A1 * | 5/2009 | Gerl | | G10L 17/04 |
| | | | | 704/243 |
| 2011/0202340 A1 * | 8/2011 | Ariyaeeinia | | G10L 17/20 |
| | | | | 704/233 |
| 2014/0379332 A1 * | 12/2014 | Rodriguez | | G10L 17/00 |
| | | | | 704/219 |
| 2015/0025887 A1 * | 1/2015 | Sidi | | G10L 17/02 |
| | | | | 704/245 |
| 2015/0255060 A1 * | 9/2015 | Tomita | | G10L 15/02 |
| | | | | 704/254 |
| 2015/0301796 A1 * | 10/2015 | Visser | | G06F 3/167 |
| | | | | 715/728 |
| 2016/0098987 A1 * | 4/2016 | Stolcke | | G10L 15/063 |
| | | | | 704/232 |

FOREIGN PATENT DOCUMENTS

JP      2013-174768         9/2013
WO      WO 2012/063424 A1   5/2012
WO      WO 2012/175094      12/2012

OTHER PUBLICATIONS

Japanese Office Action issued in corresponding Japanese Patent Application No. 2014-204585, dated Aug. 21, 2018.
Kanagasundaram, A, et al., Improving Short Utterance I-Vector Speaker verification using Utterance Variance Modelling and Compensation Techniques, Speech Communication, Elsevier B.V., Feb. 3, 2014, pp. 69-82.
Kanagasundaram, A, et al., Improving Short Utterance based I-Vector Speaker Reconition using Source and Utterance-Duration Normalization Techniques, Interspeech 2013., Aug. 25, 20134, pp. 2465-2469.:https://www.sciencedirect.com/science/article/pll/S01676393140000 53.
Droppo, Jasha, et al., Maximum Mutual Information SPLICE Transform for Seen and Unseen Conditions, Proc. Interspeech 2005, Portugal, ISCA, Sep. 4, 2005, pp. 989-992.

* cited by examiner

SPEECH PROCESSING APPARATUS, SPEECH PROCESSING METHOD AND COMPUTER-READABLE MEDIUM

CROSS-REFERENCE TO RELATED PATENT APPLICATIONS

This application is based upon and claims the benefit of priority from Japanese Patent Application No. 2014-204585, filed on Oct. 3, 2014. The entire disclosures of the above-referenced applications are incorporated herein by reference.

BACKGROUND

Technical Field

The present disclosure may generally relate to a speech processing apparatus, a speech processing method and a computer-readable medium.

Description of the Related Art

In some aspects, speech processing apparatuses that extract an acoustic feature representing individuality for identifying a speaker that has made speech and an acoustic feature representing a language conveyed by the speech from a speech signal may be known. In other aspects, speaker recognition apparatuses that presume a speaker from the speech signal using these acoustic features and language recognition apparatuses that presume a language from the speech signal using these acoustic features may be known.

In a speaker recognition apparatus that uses a speech processing apparatus of this type, the speech processing apparatus may evaluate a degree of similarity between an acoustic feature extracted from a speech signal and a speaker model expressing a speaker dependency of a tendency of appearance of the acoustic feature, and based on the evaluation, select a speaker. For example, the speaker recognition apparatus may select a speaker identified according to a speaker model evaluated as having a highest degree of similarity. In some instances, if a speech signal to be input to the speaker recognition apparatus lacks some type of sound or contains noise, distortion may occur in acoustic feature of the speech signal and a difference, thus, may occur between the acoustic feature and an acoustic feature belonging to the speaker model, which may result in decrease in accuracy of speaker recognition.

There may be a technique in which based on a characteristic of a speech signal input to a speaker recognition apparatus, a determination criterion for speaker recognition is adjusted, thereby suppressing decrease in accuracy of the speaker recognition.

SUMMARY OF THE DISCLOSURE

Exemplary embodiments of the present disclosure overcome the above disadvantages and other disadvantages not described above. Also, the present exemplary embodiments are not required to overcome the disadvantages described above, and an exemplary embodiment of the present disclosure may not overcome any of the problems described above.

According to an aspect of the present disclosure, a speech processing apparatus is disclosed. The speech processing apparatus may include a memory storing instructions, and at least one processor configured to process the instructions to calculate an acoustic diversity degree representing a degree of variation in types of sounds included in a speech signal representing a speech, on a basis of the speech signal, and compensate for a recognition feature value calculated to recognize specific attribute information from the speech signal, using the acoustic diversity degree.

According to another aspect of the present disclosure, another speech processing apparatus is disclosed. The speech processing apparatus may include a memory storing instructions, and at least one processor configured to process the instructions to receive a recognition feature value calculated to recognize a speaker that has provided a speech signal representing a speech, and compensate for the recognition feature value of the speech signal, on a basis of the speech signal, a recognition feature value of each of at least one first speech signal and a recognition feature value of each of at least one second speech signal, and wherein the at least one first speech signal includes at least one speech signal obtained by segmentation of the at least one second speech signal. According to another aspect of the present disclosure, an analysis method is disclosed. The analysis method may include calculating an acoustic diversity degree representing a degree of variation in types of sounds included in a speech signal representing a speech, on a basis of the speech signal, and compensating for a recognition feature value calculated to recognize specific attribute information from the speech signal, using the acoustic diversity degree.

According to another aspect of the present disclosure, a non-transitory computer-readable storage medium stores instructions that when executed by a computer enable the computer to implement a method is disclosed. The method may include calculating an acoustic diversity degree representing a degree of variation in types of sounds included in a speech signal representing a speech, on a basis of the speech signal, and compensating for a recognition feature value calculated to recognize specific attribute information from the speech signal, using the acoustic diversity degree.

DETAILED DESCRIPTION

Figure 1:
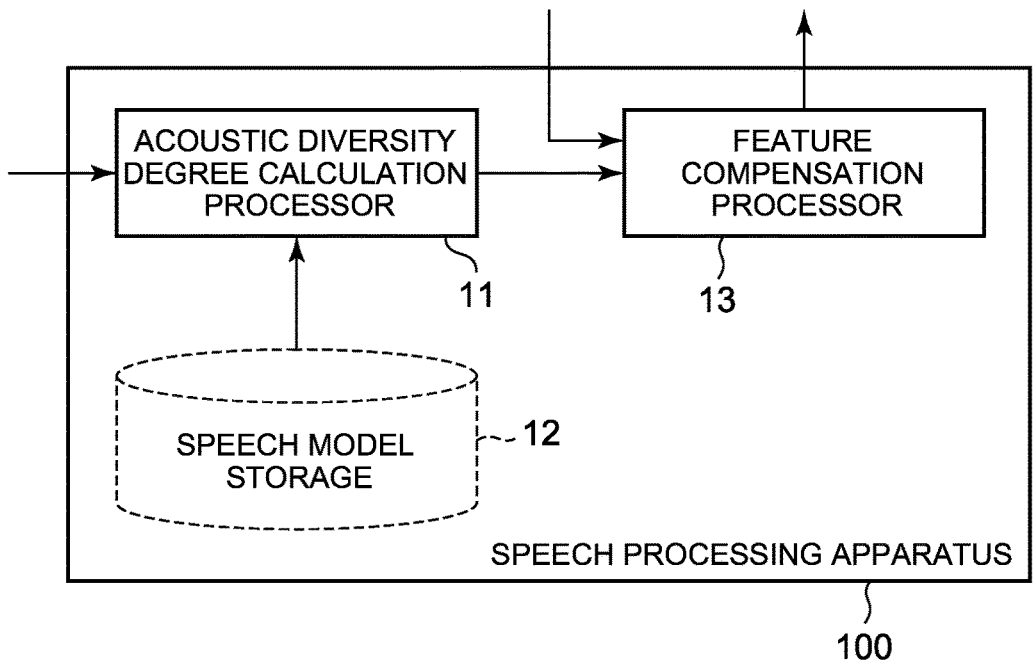
FIG. 1 is a functional block diagram illustrating an example of a functional configuration of a speech processing apparatus according to disclosed embodiments.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The biometric recognition system in the related technique discussed above may calculate a ratio between voice periods and voiceless periods contained in a speech signal or a ratio of repetitive utterance periods included in a speech signal as a characteristic representing diversity of the speech signal. The biometric recognition system may shift a determination threshold value for speaker recognition using the calculated value as a degree of reliability of a speaker recognition result, thereby suppressing decrease in speaker recognition accuracy.

However, in some aspects, the related technique may not properly obtain acoustic features for speaker recognition, and the speaker recognition accuracy may be unable to sufficiently be enhanced in the related technique.

The related technique may set a determination threshold value for speaker recognition so as to vary according to the degree of diversity of sounds contained in a speech signal input to the speaker recognition apparatus. However, the technique may merely calculate a characteristic of a speech signal input to the speaker recognition device, and may only extract an acoustic feature of the speech signal according to a uniform procedure. Further, the technique may fail to enhance the accuracy of a speaker recognition result itself where a speech signal for speaker model learning or a speech signal of a speaker recognition target cannot sufficiently be obtained.

Exemplary embodiments of a speech processing apparatus or the like and a speaker recognition apparatus will be described below with reference to the drawings. Components provided with a same reference numeral in the exemplary embodiments perform operation similar to one another.

First Example

FIG. 1 is a functional block diagram illustrating an example of a functional configuration of a speech processing apparatus 100 according to at least one exemplary embodiment. As illustrated in FIG. 1, the speech processing apparatus 100 may include an acoustic diversity degree calculation processor 11 and a feature compensation processor 13. The speech processing apparatus 100 may include a speech model storage 12.

(Speech Model Storage 12)

The speech model storage 12 may store one or more speech models. Each speech model may be configured to identify a type of a sound represented by an instantaneous speech signal. Each speech model may include information for calculating numerical value information representing a type of a sound included in a speech signal. For example, the type of a sound may be a sound class obtained as a result of clustering speech signals on a basis of similarities. For example, the type of a sound may be a class determined by language knowledge such as phonemes.

The speech model(s) stored in the speech model storage 12 may be speech model(s) trained according to common optimization criteria, using speech signals for training. The speech model storage 12 may store two or more speech models learned with speech signals for training separated by, for example, gender (male or female) of speakers and recording environment (indoor or outdoor).

FIG. 1 may indicate an example in which the speech model storage 12 is incorporated in the speech processing apparatus 100. In some aspects, the configuration of the speech model storage 12 may not be limited to this example. The speech model storage 12 may be provided by a storage apparatus that is separate from the speech processing apparatus 100.

(Acoustic Diversity Degree Calculation Processor 11)

The acoustic diversity degree calculation processor 11 may receive a speech signal representing a speech. The acoustic diversity degree calculation processor 11 may calculate an acoustic diversity degree representing a degree of variation in type of sounds included in the speech signal from the received speech signal, using the one or more speech models stored in the speech model storage 12. The acoustic diversity degree calculation processor 11 may output a result of the calculation (result of processing in the acoustic diversity degree calculation processor 11). In some aspects, "receive (reception)" may refer to, for example, reception of a speech signal from an external apparatus or another processing apparatus or delivery of a processing result of speech signal processing from another program. In other aspects, "output" may refer to, for example, transmission to an external apparatus or another processing apparatus or delivery of a result of processing in the acoustic diversity degree calculation processor 11 to another program. The acoustic diversity degree calculation processor 11 may output the result of the calculation to the feature compensation processor 13. In some aspects, an acoustic diversity degree calculated for a speech signal may be referred to as an acoustic diversity degree of the speech signal.

A method using a speech model when the acoustic diversity degree calculation processor 11 calculates an acoustic diversity degree will be described. For example, where the speech model is a Gaussian mixture model (GMM), the acoustic diversity degree calculation processor 11 may calculate a degree of appearance of each type of sound included in a speech signal on a basis of means, variances and mixing coefficients of respective component distributions the Gaussian mixture model has. For example, if the speech model is a neural network, the acoustic diversity degree calculation processor 11 may calculate a degree of appearance of each type of sound included in a speech signal, on a basis of weighing factors the neural network has. In some aspects, the acoustic diversity degree calculation processor 11 can calculate degrees of appearance, which are values obtained as a result of calculating distribution of types of sounds included in a speech signal, using the speech model. The acoustic diversity degree calculation processor 11 may calculate an acoustic diversity degree using the calculated values.

As described above, the acoustic diversity degree calculation processor 11 may calculate an acoustic diversity degree of a speech signal using calculated degrees of appearance. Therefore, the acoustic diversity degree calculation processor 11 can calculate an acoustic diversity degree with variation in type of sounds in a speech signal more reflected therein.

An example of a method for the acoustic diversity degree calculation processor 11 to calculate an acoustic diversity degree $V(x)$ of a speech signal x will be described. For example, where a speech model is a Gaussian mixture model, respective component distributions in the Gaussian mixture model may correspond to respective different types of sounds. In some aspects, the acoustic diversity degree calculation processor 11 may obtain a posterior probability of each component distribution in the Gaussian mixture model, which is a speech model, for the speech signal x. A posterior probability $P_i(x)$ of an i-th component distribution in the Gaussian mixture model can be calculated according to the following expression.

[Expression 1]

$$P_i(x) = \frac{w_i N(x|\theta_i)}{\Sigma_j w_j N(x|\theta_j)} \quad (1)$$

Function N( ) may represent a probability density function of a Gaussian distribution, $\theta_i$ may denote parameter(s) (means and/or variance) of the i-th component distribution in the Gaussian mixture model, and $w_i$ may denote a mixing coefficient of the i-th component distribution in the Gaussian mixture model. The $P_i(x)$ may represent a degree of the speech signal x being included in the i-th component distribution in the Gaussian mixture model. The acoustic diversity degree calculation processor 11 may provide an acoustic diversity degree V(x) as a vector including the $P_i(x)$ as a component. For example, where the number of mixed components in a Gaussian mixture model, which is a speech model, is four, the acoustic diversity degree calculation processor 11 may set the acoustic diversity degree V(x) as $V(x)=[P_1(x), P_2(x), P_3(x), P_4(x)]$.

Another example of the method for the acoustic diversity degree calculation processor 11 to calculate an acoustic diversity degree V(x) of a speech signal x will be described. For example, where a speech model is a Gaussian mixture model, the acoustic diversity degree calculation processor 11 may divide the speech signal x into time series of short-time speech signals {x1, x2, . . . , xT} (T is an arbitrary natural number). For each of the short-time speech signals, the acoustic diversity degree calculation processor 11 may obtain a component distribution number i (Argmax_i) whose appearance probability is largest, by Argmax_i(xt)=N (xt|$\theta_4$). Where the number of times of the i-th component distribution in the Gaussian mixture model being selected is $C_i(x)$, the $C_i(x)$ may represent the degree of the speech signal x being included in the i-th component distribution in the Gaussian mixture model. The acoustic diversity degree calculation processor 11 may provide an acoustic diversity degree V(x) as a vector including the $C_i(x)$ or $C_i(x)/\Sigma_j C_j(x)$ as a component. For example, where the number of mixed components in a Gaussian mixture model, which is a speech model, is four, the acoustic diversity degree calculation processor 11 may set the acoustic diversity degree V(x) as $V(x)=[C_1(x), C_2(x), C_3(x), C_4(x)]$.

The acoustic diversity degree calculation processor 11 may calculate acoustic diversity degrees of speech signals obtained by segmentation of a received speech signal. The acoustic diversity degree calculation processor 11 may, for example, segment a received speech signal to speech signals of a certain period of time and calculate an acoustic diversity degree for each of the segmented speech signals. When a length of duration of a speech signal with reception of the speech signal as a start time exceeds a predetermined value, the acoustic diversity degree calculation processor 11 may calculate an acoustic diversity degree of the received speech signal at that point of time.

The acoustic diversity degree calculation processor 11 may determine a difference between an acoustic diversity degree calculated for a received speech signal and an acoustic diversity degree of another reference speech signal, as an acoustic diversity degree to be output. For example, where an acoustic diversity degree calculated for a received speech signal is [0.2, 0.8] and an acoustic diversity degree of another reference speech signal is [0.4, 0.6], the acoustic diversity degree calculation processor 11 may determine [−0.2, +0.2], which is a respective difference between the two, as an acoustic diversity degree to be output.

The acoustic diversity degree calculation processor 11 may determine a combination of an acoustic diversity degree calculated for a received speech signal and an acoustic diversity degree of another reference speech signal, as an acoustic diversity degree to be output. For example, it is assumed that an acoustic diversity degree calculated for a received speech signal is [0.2, 0.8] and an acoustic diversity degree of another reference speech signal is [0.4, 0.6]. In this case, the acoustic diversity degree calculation processor 11 may determine [0.2, 0.8, 0.4, 0.6], which is a combination of these acoustic diversity degrees, as an acoustic diversity degree to be output.

Where two or more speech models stored in the speech model storage 12 are used, the acoustic diversity degree calculation processor 11 may calculate the above-described degrees of appearance on a basis of each of the speech models. The acoustic diversity degree calculation processor 11 may employ an acoustic diversity degree obtained by weighing and adding up two or more acoustic diversities calculated using the calculated degrees of appearance.

(Feature Compensation Processor 13)

The feature compensation processor 13 may receive a recognition feature value calculated to recognize specific attribute information from a speech signal, and an acoustic diversity degree calculated for the speech signal and output by the acoustic diversity degree calculation processor 11. In some aspects, "attribute information" may refer to information indicating, e.g., speaker characteristics and/or a spoken language. The recognition feature value may be calculated to recognize such attribute information and, can be regarded as information indicating an acoustic feature of the speech signal. The feature compensation processor 13 may perform compensation processing for compensating for the received recognition feature value using the received acoustic diversity degree and output a result of the processing. In some aspects, a recognition feature value calculated for a speech signal may be referred to as a recognition feature value of the speech signal.

An example of a method for the feature compensation processor 13 to compensate for (or correct) a recognition feature value F(x) of a speech signal x to calculate a compensated feature value G(x) will be described. The compensated feature value may be referred as a corrected feature value. A recognition feature value F(x) the feature compensation processor 13 receives may be, for example, a vector calculated as an i-vector described in "Front-End Factor Analysis for Speaker Verification" by Najim Dehak, Patrick J. Kenny, Reda Dehak, Pierre Dumouchel, and Pierre Ouellet in IEEE Transactions on Audio, Speech and Language Processing, vol. 19, no. 4, pp. 788-798, 2011. An acoustic diversity degree V(x) the feature compensation processor 13 receives may be, for example, a vector including $P_i(x)$, which is a result of calculation of Expression (1) above as a component. The feature compensation processor 13 may calculate a compensated feature value G(x) using a multi-layer neural network with these two vectors F(x) and V(x) as inputs and the compensated feature value G(x) as an output.

A method for, where the feature compensation processor 13 uses a multi-layer neural network, setting parameters for the multi-layer neural network will be described. Parameters for a multi-layer neural network may be, for example, a weighing factor and a biasing factor, which will be described below. The feature compensation processor 13 may determine the parameters for a multi-layer neural network by a general supervised machine learning method. Training information may be, for example, a pair of an input training signal to be provided to a below described input layer and an output training signal to be provided to a below described output layer. The feature compensation processor 13 may optimize a weighing factor and a biasing factor so as to, for example, minimize an error between a result of calculation performed by the multi-layer neural network for an input training signal, and an output training signal. Optimization of each of the factors may be possible, for example, by means of a general numerical iterative calculation method such as a steepest descent method. The feature compensation processor 13 may set the respective optimized factors as the parameters.

An example of training information (an input training signal and an output training signal) for a case where the feature compensation processor 13 uses a multi-layer neural network and sets parameters for the multi-layer neural network according to the above-described supervised learning method will be described. An output training signal may be, for example, a recognition feature value of a reference speech signal (second speech signal). In some aspects, "reference speech signal" may refer to, for example, a speech signal which is less biased in sounds such as a speech for speaker model learning for a speaker. The output training signal may have a recognition feature value and an acoustic diversity degree of a reference speech signal. The input training signal may include, for example, a recognition feature value and an acoustic diversity degree of one or more speech signals (short-time speech signals: first speech signals) obtained by segmentation of the reference speech signal. The segmentation of the reference speech signal may enable the feature compensation processor 13 to obtain a short-time speech signal for a period (short time period) that is largely biased in sound compared to the reference speech signal. The feature compensation processor 13 that has learned using training information such as that in this example may receive a recognition feature value and an acoustic diversity degree of a short-time speech signal that is largely biased in sound. The feature compensation processor 13 may compensate for the recognition feature value of the speech signal using the acoustic diversity degree. Consequently, the feature compensation processor 13 can output a recognition feature value that is closer to a recognition feature value of a long-time speech signal having a smaller sound bias.

Figure 3:
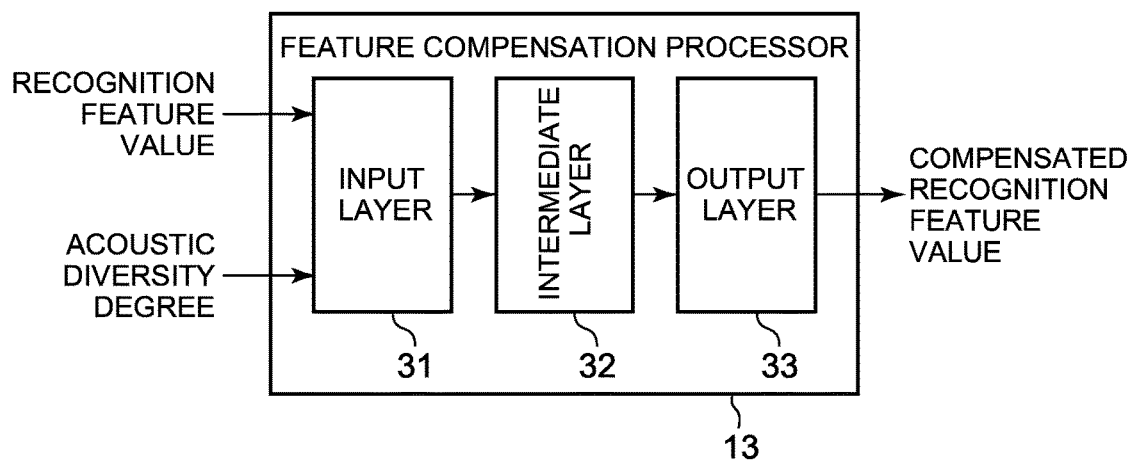
FIG. 3 is a diagram illustrating an example of a configuration of a feature compensation processor in the speech processing apparatus according to disclosed embodiments.

A configuration where the feature compensation processor 13 uses a multi-layer neural network will be described with reference to FIG. 3. FIG. 3 is a diagram illustrating an example of a configuration of the feature compensation processor 13 in the speech processing apparatus 100 according to at least one exemplary embodiment. As illustrated in FIG. 3, the feature compensation processor 13 may include an input layer 31, an intermediate layer (hidden layer) 32 and an output layer 33.

The feature compensation processor 13 may input a received recognition feature value F(x) and a received acoustic diversity degree V(x) to the input layer 31. The input layer 31 may combine the input vectors into one vector. The vector resulting from the combination by the input layer 31 (also referred to as combined vector) may be expressed by $L_{in}(x)=[F(x), V(x)]$. The input layer 31 may output the combined vector $L_{in}(x)$ to the intermediate layer 32.

The intermediate layer 32 may perform, for example, calculation of Expression (2) below for the received information (that is, the combined vector) $L_{in}(x)$, and output a calculation result $L_{mid}(x)$ to the output layer 33.

[Expression 2]

$$Y_j = (1-\exp(-(b_j + \Sigma_i w_{ji} X_i)))^{-1} \quad (2)$$

$X_i$ may denote an i-th component in the received information, and $Y_j$ may denote a j-th component in the calculation result. $b_j$ may be a biasing factor for the j-th component in the calculation result, and $W_{ji}$ may be a weighing factor for the j-th component in the calculation result and the i-th component in the received information. In some aspects, the intermediate layer 32 may output Y, which is a result of calculation with X in Expression (2) as $L_{in}(x)$, as $L_{mid}(x)$.

The output layer 33 may perform calculation, for example, with X in Expression (2) as $L_{mid}(x)$, for the received information, and output Y, which is a result of the calculation, as $L_{out}(x)$. The feature compensation processor 13 may output a whole or a part of the vector $L_{out}(x)$ output by the output layer 33, as a compensated feature value G(x). Where the feature compensation processor 13 uses a multi-layer neural network, the multi-layer neural network may include two or more intermediate layers.

As described above, the feature compensation processor 13 may compensate for a recognition feature value using a multi-layer neural network, enabling a recognition feature value that is closer to a recognition feature value of a reference speech signal to be output.

Another example of the method for the feature compensation processor 13 to compensate for a recognition feature value F(x) of a speech signal x to calculate a compensated feature value G(x) will be described. The feature compensation processor 13 may store, in advance, one or more pairs of an input training signal (a recognition feature value and an acoustic diversity degree of a short-time speech signal) and an output training signal (a recognition feature value of a reference speech signal) as in the above-described example. The feature compensation processor 13 may search for a recognition feature value and an acoustic diversity degree having a high degree of similarity to a received recognition feature value F(x) and a received acoustic diversity degree V(x) from the recognition feature values and the acoustic diversities of the short-time speech signals stored in advance. The feature compensation processor 13 may output, for example, a recognition feature value (output training signal) associated with an input training signal having a highest degree of similarity, as a compensated feature value G(x). The one or more pairs may be stored in the feature compensation processor 13 or may be stored in other memory (for example, the speech model storage 12).

As described above, a diversity representing a degree of variation in type of sounds included in a speech signal can be expressed by an acoustic diversity degree calculated by the acoustic diversity degree calculation processor 11. Consequently, for example, where there are two speech signals of a same length and one of the speech signals is repetition of a same word and the other is not, the acoustic diversity degree calculation processor 11 can indicate that the types of sounds included in the two speech signals are different from each other, using acoustic diversities.

The feature compensation processor 13 may compensate for a received recognition feature value based on a received acoustic diversity degree so as to be close to an acoustic feature of a speech signal that is less biased in types of sounds and/or less lack of some type of sound. Consequently, the feature compensation processor 13 can obtain a recognition feature value that is suitable for speaker recognition.

The speech model storage 12 in the speech processing apparatus 100 according to the present example may be a non-volatile recording medium, and the speech model storage 12 can be provided by a volatile recording medium.

A process of the speech model(s) being stored in the speech model storage 12 may not be specifically limited. For example, the speech model(s) may be stored in the speech model storage 12 via a recording medium or the speech model(s) transmitted via, e.g., a telecommunication line may be stored in the speech model storage 12. In some instances, the speech model(s) input via an input device may be stored in the speech model storage 12.

The acoustic diversity degree calculation processor 11 and the feature compensation processor 13 can be provided, for example, a central processing unit and a memory. A procedure of processing in, e.g., the acoustic diversity degree calculation processor 11 may be provided by, for example, software, and the software may be recorded in a recording medium such as a ROM (read-only memory). Each component of the speech processing apparatus 100 may be provided by hardware (dedicated circuit).

Operation of First Example

Figure 2:
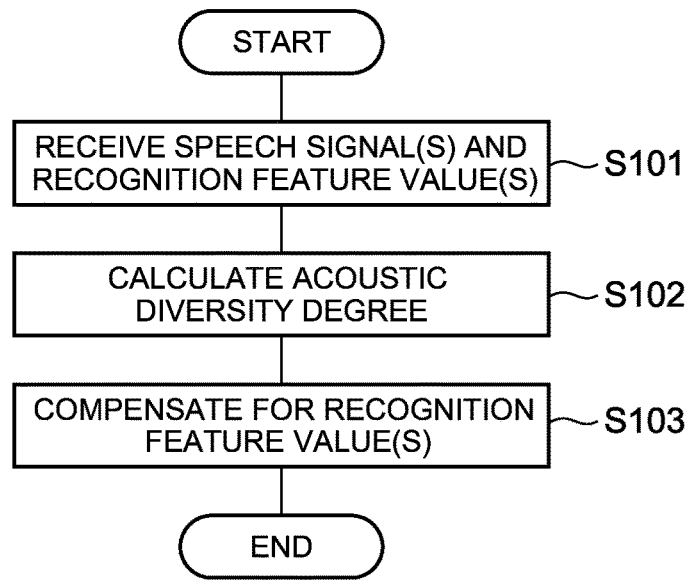
FIG. 2 is a flowchart illustrating an example of operation of the speech processing apparatus according to disclosed embodiments.

Operation of the speech processing apparatus 100 according to the first example will be described with reference to the flowchart in FIG. 2. FIG. 2 is a flowchart illustrating an example of operation of the speech processing apparatus 100.

In the step S101, the speech processing apparatus 100 may receive one or more speech signals from the outside, and provide the one or more speech signals to the acoustic diversity degree calculation processor 11. In the step S101, the speech processing apparatus 100 may receive recognition feature value(s) respectively corresponding to the received one or more speech signals from the outside, and provide the recognition feature value(s) to the feature compensation processor 13.

In the step S102, the acoustic diversity degree calculation processor 11 may calculate an acoustic diversity degree for each of the received one or more speech signals, using the one or more speech models stored in the speech model storage 12.

In the step S103, for each of the received one or more recognition feature values, the feature compensation processor 13 may calculate a compensated feature value resulting from compensation of the recognition feature value, using the received acoustic diversity degree. In the step S103, the feature compensation processor 13 may output the calculated compensated feature value(s). Upon an end of reception of the speech signal from the outside, the speech processing apparatus 100 may terminate the series of processing.

Effects of First Example

As described above, the speech processing apparatus 100 according to the present example may enable enhancement in accuracy of speaker recognition.

This may be because the acoustic diversity degree calculation processor 11 calculates an acoustic diversity degree of a speech signal representing a speech and the feature compensation processor 13 compensates for a recognition feature value calculated to recognize specific attribute information from the speech signal, using the acoustic diversity degree of the speech signal.

As described above, the speech processing apparatus 100 according to the present example may compensate for a recognition feature value for a speech signal, which is an acoustic feature of the speech signal, based on an acoustic diversity degree. Consequently, the speech processing apparatus 100 according to the present example may enable obtainment of a recognition feature value that is suitable for speaker recognition even if sounds included in the speech signal is biased in types of sounds and/or is lack of some type of sound or even if there is a large difference between an acoustic diversity degree of the speech signal and an acoustic diversity degree of a speech signal for speaker model learning. Therefore, the speech processing apparatus 100 according to the present example may enable enhancement in accuracy of speaker recognition even in a situation in which no sufficient speech signal can be obtained.

Second Example

Figure 4:
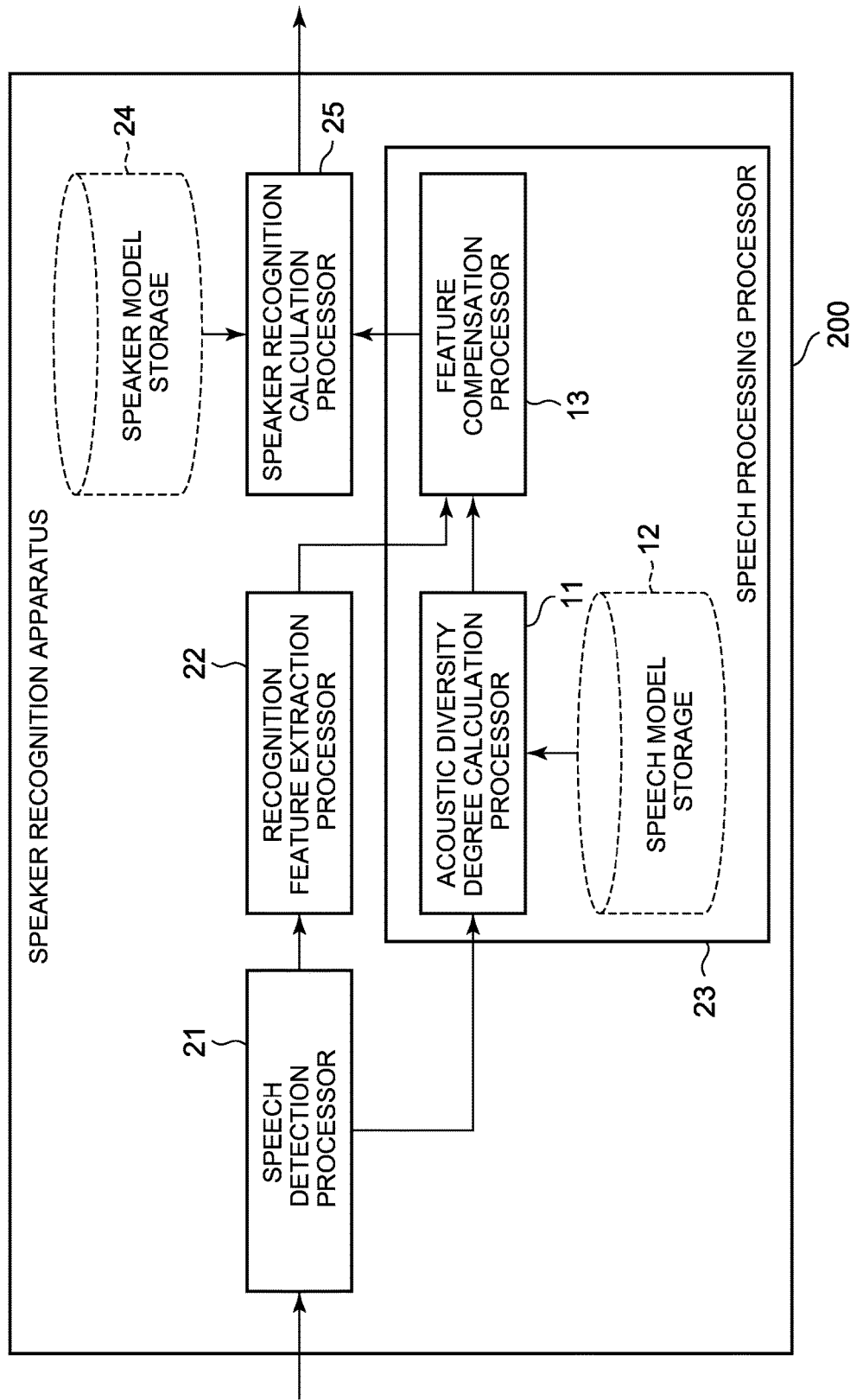
FIG. 4 is a functional block diagram illustrating an example of a functional configuration of a speaker recognition apparatus according to disclosed embodiments.

A second example, which is based on the speech processing apparatus 100 according to the first example described above, will be described. The present example will be described in terms of a speaker recognition apparatus including the speech processing apparatus 100 according to the first example described above, as an example of a speech processing apparatus. FIG. 4 is a functional block diagram illustrating an example of a functional configuration of a speaker recognition apparatus (speech processing apparatus) 200 in at least one exemplary embodiment. As illustrated in FIG. 4, the speaker recognition apparatus 200 may include a speech period detection processor 21, a recognition feature extraction processor 22, a speech processing processor 23 and a speaker recognition calculation processor 25. The speaker recognition apparatus 200 may include a speaker model storage 24.

The speaker recognition apparatus 200 in the present example may be an example of an attribute recognition apparatus that recognizes specific attribute information from a speech signal. A speaker recognition apparatus may recognize information indicating a speaker that has provided a speech signal. A language recognition apparatus may recognize information indicating a language conveyed by a speech signal. The speaker recognition apparatus 200 according to the present example may recognize, for example, information indicating a speaker that has provided a speech or a language conveyed by the speech such as described above, as specific attribute information. Therefore, the speaker recognition apparatus 200 according to the present example may be applicable to a speaker recognition apparatus and a language recognition apparatus such as described above.

The speech period detection processor 21 may receive a speech signal. The speech period detection processor 21 may detect speech periods included in the received speech signal and segment the received speech signal into the speech periods. The speech period detection processor 21 may output the segmented speech signals, which is a result of the segmentation (result of processing in the speech period detection processor 21), to the recognition feature extraction processor 22 and the speech processing processor 23. Here, "receive (reception of) a speech signal may refer to, for example, reception of a speech signal from an external apparatus or another processing apparatus or delivery of a processing result of speech signal processing from another program. The speech period detection processor 21 may perform segmentation so as to determine, for example, a period whose sound volume is smaller than a predetermined value continuously for a certain period of time in a speech signal as being soundless and determine periods prior or subsequent to such period as being different speech periods.

The recognition feature extraction processor 22 may receive one or more speech signals output by the speech period detection processor 21. The recognition feature extraction processor 22 may extract a feature for recognizing a specific attribute from each of the received speech signal(s) and thereby calculate recognition feature value(s) of the speech signal(s). The recognition feature extraction processor 22 may output the calculated recognition feature value(s) to the feature compensation processor 13. Each of the recognition feature value(s) may be, for example, in the form of a vector including one or more values, for example, an i-vector.

The speech processing processor 23 may receive the one or more speech signals output by the speech period detection processor 21 and the one or more recognition feature values output by the recognition feature extraction processor 22. The speech processing processor 23 may perform speech processing corresponding to that of the speech processing apparatus 100 according to the first example described above to compensate for the received recognition feature value(s). The speech processing processor 23 may output the recognition feature value(s), which is a result of the compensation (result of the processing in the speech processing processor 23), to the speaker recognition calculation processor 25. A configuration and operation of the speech processing processor 23 may be similar to the configuration and operation of the speech processing apparatus 100 in the first example. For example, the speech processing processor 23 may be the speech processing apparatus 100 according to the first example described above.

The speaker model storage 24 may store one or more speaker models. The speaker model(s) each may include information for calculating, for an input speech signal, numerical information (score) representing a degree of the speech signal matching with the relevant model.

FIG. 4 may indicate an example in which the speaker model storage 24 is incorporated in the speaker recognition apparatus 200. In some instances, the configuration of the speaker model storage 24 may not be limited to this example. The speaker model storage 24 may be provided by a storage apparatus that is separate from the speaker recognition apparatus 200. The speaker model storage 24 may be provided by a storage apparatus that is the same as the speech model storage 12.

The speaker recognition calculation processor (attribute recognition processor) 25 may receive the recognition feature value(s) output by the speech processing processor 23. The speaker recognition calculation processor 25 may calculate a degree of each of the received recognition feature value(s) matching with a corresponding one of the speaker model(s) (score of speaker recognition) with reference to the one or more speaker models stored in the speaker model storage 24.

Consequently, the speaker recognition calculation processor 25 may recognize specific attribute information included in the speech signal. The speaker recognition calculation processor 25 may recognize the specific attribute information and thereby can recognize, e.g., a speaker and/or a language identified by the specific attribute information.

The speaker recognition calculation processor 25 may output an obtained result (speaker recognition result) to the outside. In some aspects, "output" may refer to, for example, transmission to an external apparatus or another processing apparatus or delivery of a processing result in the speaker recognition calculation processor 25 to another program. In other aspects, "output" may be a concept including, e.g., indication on a display, projection using a projector and printing via a printer.

For example, where both a recognition feature value calculated from a speech signal and a speaker model are included in i-vectors, the speaker recognition calculation processor 25 can calculate a speaker recognition score based on a respective cosine similarity between them. For i-vectors, which are speaker models corresponding to respective speakers, those calculated using speech signals for speaker model learning, which are provided with respective speaker IDs (identifiers) as training labels, may be used. A speaker ID may be an identifier for identifying a speaker.

Where each of the speaker model(s) stored in the speaker model storage 24 is configured in the form of an i-vector, when a speaker model is created from a speech signal for speaker model learning, compensation processing by speech processing processor 23 (speech processing apparatus 100) may be performed on the speaker model.

The speech processing processor 23 may output compensated feature value(s) that are different for the speaker(s) ID of the speaker model(s) stored in the speaker model storage 24. For example, where a speaker ID is "A" and a recognition feature value for the speaker ID "A" is $F\_A(x)$, the speech processing processor 23 may output a compensated feature value $G\_A(x)$ for the speaker ID "A". Where a speaker ID is "B" and a recognition feature value for the speaker ID "B" is $F\_B(x)$, the speech processing processor 23 may output a recognition feature value $G\_B(x)$ for the speaker ID "B".

A speaker recognition result output by the speaker recognition calculation processor 25 may be, for example, a list of speaker IDs listed in order of scores calculated based on the respective speaker models where the speaker recognition apparatus 200 intends to identify a speaker. A speaker recognition result output by the speaker recognition calculation processor 25 may be, for example, information for determining whether or not verification can be made based on the score calculated based on a speaker model for a verification target where the speaker recognition apparatus 200 intends to verify a speaker.

The speaker model storage 24 in the speaker recognition apparatus 200 according to the present example may be a non-volatile recording medium, and the speaker model storage 24 may be provided by a volatile recording medium.

A process of the speaker model(s) being stored in the speaker model storage 24 may not be specifically limited. For example, the speaker model(s) may be stored in the speaker model storage 24 via a recording medium or the speaker model(s) transmitted via, e.g., a telecommunication line may be stored in the speaker model storage 24. In some instances, speaker model(s) input via an input device may be stored in the speaker model storage 24.

The speech period detection processor 21, the recognition feature extraction processor 22, the speech processing processor 23 and the speaker recognition calculation processor 25 can be provided by, for example, a central processing unit and a memory. A procedure of processing in, e.g., the processing speech period detection processor 21 may be provided by, for example, software, and the software may be recorded in a recording medium such as a ROM. Each processor of the speaker recognition apparatus 200 may be provided by hardware (dedicated circuit).

Operation of Second Example

Figure 5:
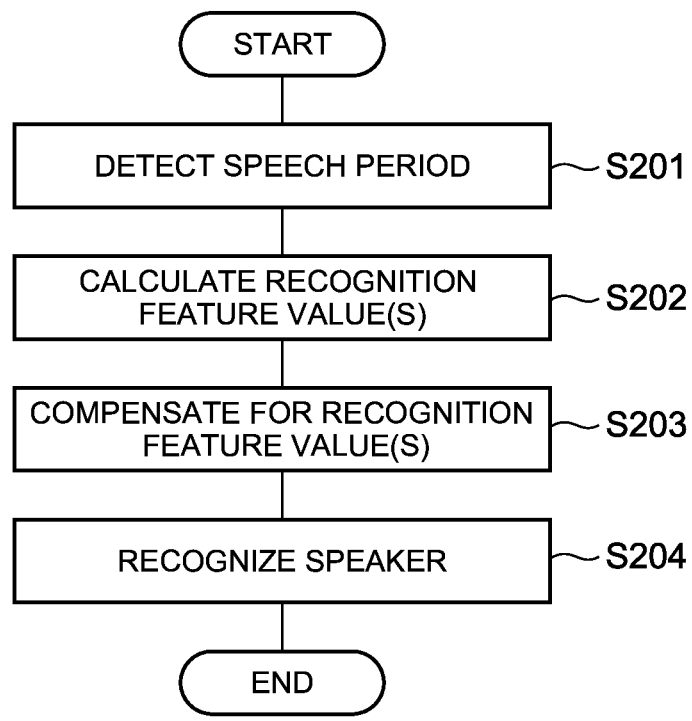
FIG. 5 is a flowchart illustrating an example of operation of the speaker recognition apparatus according to disclosed embodiments.

Operation of the speaker recognition apparatus 200 will be described with reference to the flowchart in FIG. 5. FIG. 5 is a flowchart illustrating an example of operation of the speaker recognition apparatus 200.

In the step S201, the speech period detection processor 21 may receive a speech signal from the outside. In the step S201, the speech period detection processor 21 may perform segmentation of the speech signal by detecting speech periods from the received speech signal. In the step S201, the speech period detection processor 21 may provide one or more segmented speech signals (may be referred to as segmented speech signal(s)) to the recognition feature extraction processor 22 and the speech processing processor 23.

In the step S202, the recognition feature extraction processor 22 may calculate a recognition feature value for each of the received one or more segmented speech signals. In the step S202, the recognition feature extraction processor 22 may provide the calculated one or more recognition feature values to the speech processing processor 23.

In the step S203, the speech processing processor 23 may perform speech processing in the speech processing apparatus 100 according to the first example of the present disclosure (processing in steps S101 to S103), using the received one or more segmented speech signals and the received one or more recognition feature values to compensate for each of the one or more recognition feature values. In the step S203, the speech processing processor 23 may provide the compensated recognition feature value(s) to the speaker recognition calculation processor 25.

In the step S204, the speaker recognition calculation processor 25 may calculate speaker recognition scores for the received one or more recognition feature values with reference to the one or more speaker models stored in the speaker model storage 24 and thereby recognize a speaker. In the step S204, the speaker recognition calculation processor 25 may output a result of the speaker recognition to the outside and terminate the series of processing.

Effects of Second Example

As described above, the speaker recognition apparatus 200 according to the present example may enable, as with the speech processing apparatus 100 according to the first example described above, enhancement in accuracy of speaker recognition.

This may be because the speaker recognition apparatus 200 according to the present example uses the above-described speech processing apparatus according to the first example (speech processing processor 23 in the present disclosure). Consequently, the speaker recognition apparatus 200 according to the present example can obtain recognition feature values that are suitable for speaker recognition even where there is a bias in types of sounds included in a speech signal and/or a lack of some type of sound or where there is a large difference between an acoustic diversity degree of a speech signal and an acoustic diversity degree of a speech signal for speaker model learning. Therefore, the speaker recognition apparatus 200 according to the present example may enable enhancement in accuracy of speaker recognition even in a situation in which no sufficient speech signal can be obtained.

The speaker recognition apparatus 200 in the second example of the present disclosure may be an example of an attribute recognition apparatus that recognizes specific attribute information from a speech signal. The speaker recognition apparatus 200 can be used as a speaker recognition apparatus where the speaker recognition apparatus 200 recognizes information indicating a speaker that has provided a speech signal, as specific attribute. The speaker recognition apparatus 200 can be used as a part of a speech recognition apparatus including a mechanism that, for example, based on speaker information indicating a speaker identified by the speaker recognition apparatus for a speech signal of a sentence utterance, adapts to a feature of the manner of the speaker speaking. Speaker information indicating a speaker may be information indicating the gender of the speaker and/or information indicating the age or the age group of the speaker.

The speaker recognition apparatus 200 can be used as a language recognition apparatus where the speaker recognition apparatus 200 recognizes information indicating a language conveyed by a speech signal (language forming the speech signal), as specific attribute. The speaker recognition apparatus 200 can be used as a part of a speech translation apparatus including a mechanism that selects a language to be translated, for example, based on language information indicating a language assumed by the language recognition apparatus for a speech signal of a sentence utterance.

The speaker recognition apparatus 200 can be used as an emotion recognition apparatus where the speaker recognition apparatus 200 recognizes emotion information indicating an emotion of a speaker when speaking, as specific attribute. The speaker recognition apparatus 200 can be used, for example, as a part of a speech search apparatus or a speech display apparatus including a mechanism that identifies a speech signal corresponding to a particular emotion based on emotion information assumed by the emotion recognition apparatus from accumulated speech signals of a multitude of utterances. The emotion information may include, for example, information indicating emotional expression and information indicating a character of a speaker.

As described above, the specific attribute information in the present example may be information representing at least any one of a speaker that has provided a speech signal, a language forming the speech signal, emotional expression included in the speech signal, and a character of a speaker assumed from the speech signal. The speaker recognition apparatus 200 can recognize such specific attribute information as above.

Third Example

A third example of the present disclosure will be described. The present example will be described in terms of a case where the speech processing apparatus 100 in the first example includes no acoustic diversity degree calculation processor 11. In other aspects, the present example will be described in terms of a configuration in which the feature compensation processor 13 receives a recognition feature value and outputs a compensated feature value.

A speech processing apparatus 300 according to the present example can be employed as the speech processing processor 23 in the speaker recognition apparatus 200.

Figure 6:
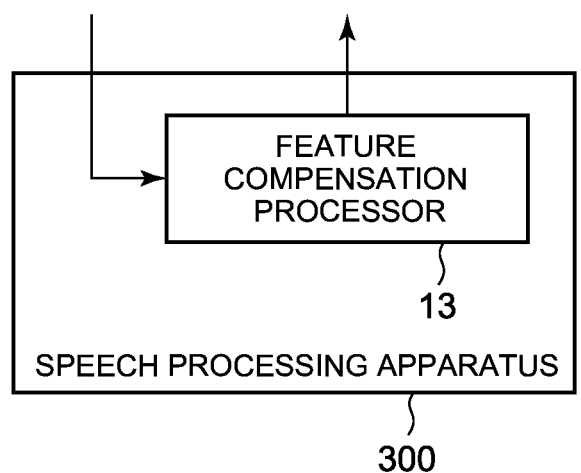
FIG. 6 is a functional block diagram illustrating an example of a functional configuration of a speech processing apparatus according to disclosed embodiments.

FIG. 6 is a functional block diagram illustrating a functional configuration of a speech processing apparatus 300 according to at least one example. In FIG. 6, the feature compensation processor 13 may receive a recognition feature value calculated based on a speech signal representing a speech to recognize specific attribute information from the speech signal. In the present example, the recognition feature value may be a recognition feature value calculated to recognize a speaker that has provided a speech signal.

The feature compensation processor 13 may regard the received recognition feature value as having an error from an original recognition feature value and operate so as to remove an error component. In some aspects, the feature compensation processor 13 may compensate for the received recognition feature value based on recognition feature value(s) of one or more first speech signals and recognition feature values of one or more second speech signals. The first speech signal(s) may be one or more speech signals obtained by segmentation of a second speech signal. The second speech signal may be a reference speech signal described in the first example.

This configuration may be suitable for a case where although a speech signal is biased in type of sounds and/or is lack of some type of sound, the degree of such bias and/or lack is small. The speech processing apparatus 300 according to the present example may have the advantage of being able to reduce an amount of calculation required for acoustic diversity degree calculation more than existing techniques.

(Regarding Hardware Configuration)

Figure 7:
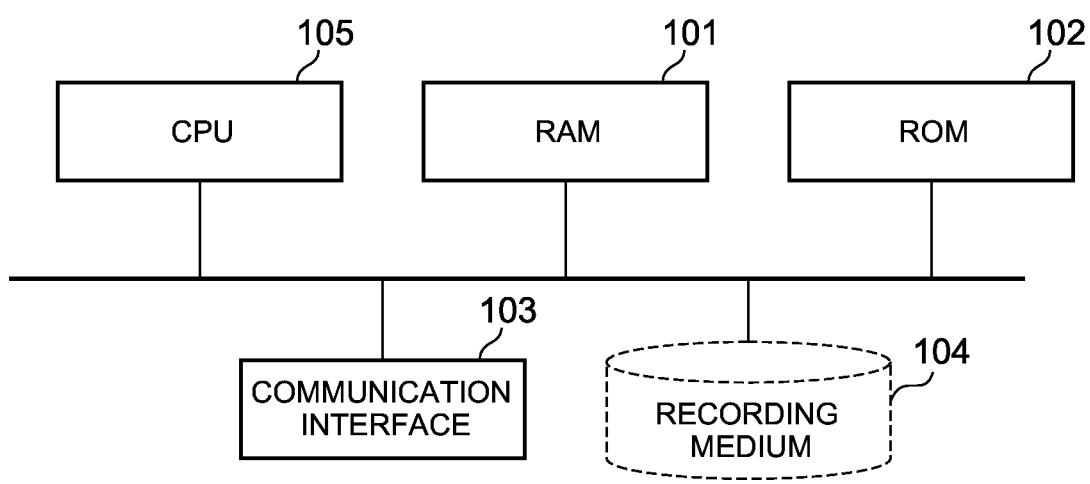
FIG. 7 is a diagram illustrating an example of a hardware configuration of a speech processing apparatus or a speaker recognition apparatus according to disclosed embodiments.

The respective components in the speech processing apparatus (100 or 300) or the speaker recognition apparatus 200 illustrated in FIGS. 1, 4 and 6 may be provided by the hardware resources illustrated in FIG. 7. In some aspects, the configuration illustrated in FIG. 7 may include a RAM (random access memory) 101, a ROM 102, a communication interface 103, a recording medium 104 and a CPU (central processing unit) 105. The CPU 105 may read various types of software programs (computer programs) stored in the ROM 102 or the recording medium 104 onto the RAM 101 and execute the software programs (computer programs), and thereby control overall operation of the speech processing apparatus (100 or 300) or the speaker recognition apparatus 200. In other aspects, in each of the above-described exemplary embodiments, the CPU 105 may execute the software programs for executing respective functions (respective components) included in the speech processing apparatus (100 or 300) or the speaker recognition apparatus 200, referring to the ROM 102 or the recording medium 104 as appropriate.

The present disclosure, which has been described taking the respective exemplary embodiments as examples, may be achieved by supplying computer programs that can provide the above-described functions to the speech processing apparatus (100 or 300) or the speaker recognition apparatus 200 and then the CPU 105 reading the computer programs onto the RAM 101 and executing the computer programs.

Such supplied computer programs may be stored in a readable/writable memory (temporary recording medium) or a computer-readable storage device such as a hard disk device. In such case, the present disclosure can be regarded as being provided by codes representing such computer programs or a recording medium that stores such computer programs.

In each of the above exemplary embodiments, a case where the functions indicated in the respective blocks in the speech processing apparatus (100 or 300) or the speaker recognition apparatus 200 illustrated in FIGS. 1, 4 and 6 may be provided by software programs as an example of the CPU 105 illustrated in FIG. 7 executing the functions. A part or all of the functions indicated in the respective blocks illustrated in FIGS. 1, 4 and 6 may be provided in the form of a hardware circuit.

Although the present disclosure has been described above using the exemplary embodiments, the present disclosure may not be limited to the above exemplary embodiments. Various alterations that can be understood by a person skilled in the art can be made to the configuration and the details of the present disclosure as long as such alterations fall within the scope of the present disclosure. In other words, the present disclosure may not be limited to the above exemplary embodiments and various alterations are possible, and it should be understood that these alternations also fall within the scope of the present disclosure.

The speech processing apparatus or the like according to an aspect of the present disclosure may have the effect of being able to enhance the speaker recognition accuracy in a situation in which no sufficient speech signal can be obtained, and may be useful as a speech processing apparatus or the like and the speaker recognition apparatus.

If information relating to a user is obtained and used in the present disclosure, the obtainment and use shall be done lawfully.

The invention claimed is:

1. A speech processing apparatus, comprising:
a memory storing instructions; and
at least one processor configured to process the instructions to perform steps including:
calculating distribution of types of sounds included in a speech signal by using a speech model configured to identify the types of sounds represented by the speech signal, wherein the types of sounds represent sound's classes clustered based on similarity of the sounds;
calculating an acoustic diversity degree representing a degree of appearance of each of the types of sounds included in the speech signal;
calculating a recognition feature to recognize an attribute of the speaker;
compensating for the recognition feature so as to have a smaller bias of the types of sounds in the speech signal, by using the acoustic diversity degree value;
generating a recognition result based on the compensated recognition feature; and
transmitting the recognition result.

2. The speech processing apparatus according to claim 1, wherein the types of sounds are types of phonemes.

3. The speech processing apparatus according to claim 1, wherein the at least one processor is further configured to process the instructions to perform steps including:
calculating the degree of appearance of each of the types of sounds by using the speech model; and
calculating the acoustic diversity degree value by using the degree of appearance;
wherein the degree of appearance represents distribution of the types of sounds included in the speech signal.

4. The speech processing apparatus according to claim 1, wherein the at least one processor is further configured to process the instructions to perform steps including:
calculating the compensated recognition feature of the speech signal based on an acoustic diversity degree, a recognition feature of each of at least one first speech signal, and a recognition feature of each of at least one second speech signal.

5. The speech processing apparatus according to claim 4, wherein the first speech signal includes one or more speech signals obtained by segmenting the at least one second speech signal.

6. The speech processing apparatus according to claim 4, wherein the at least one processor is further configured to process the instructions to perform steps including:

compensating for the recognition feature of the speech signal by using a neural network.

7. The speech processing apparatus according to claim 1, wherein the at least one processor is further configured to process the instructions to perform steps including:
recognizing the attribute of the speaker based on the speech signal,
wherein the attribute represents at least one of information indicating the speaker, a language spoken by the speaker, an emotional expression included in the speech signal, and a character of a speaker wherein the character is assumed from the speech signal.

8. A speech processing method comprising:
calculating, using at least one processor, distribution of types of sounds included in a speech signal by using a speech model configured to identify the types of sounds represented by the speech signal, wherein the types of sounds represent sound's classes clustered based on similarity of the sounds;
calculating, using the at least one processor, an acoustic diversity degree representing a degree of appearance of each of the types of sounds included in the speech signal;
calculating a recognition feature to recognize an attribute of the speaker;
compensating for the recognition feature so as to have a smaller bias of the types of sounds in the speech signal, using the at least one processor, by using the acoustic diversity degree value;
generating a recognition result based on the compensated recognition feature; and
transmitting the recognition result.

9. The speech processing method of claim 8, wherein the types of sounds are types of phonemes.

10. The speech processing method of claim 8, further comprising:
calculating the degree of appearance of each of the types of sounds by using the speech model; and
calculating the acoustic diversity degree value by using the degree of appearance;
wherein the degree of appearance represents distribution of the types of sounds included in the speech signal.

11. The speech processing method of claim 8, further comprising:
calculating the compensated recognition feature of the speech signal based on an acoustic diversity degree, a recognition feature of each of at least one first speech signal, and a recognition feature of each of at least one second speech signal.

12. The speech processing method of claim 11, wherein the first speech signal includes one or more speech signals obtained by segmenting the at least one second speech signal.

13. The speech processing method of claim 11, further comprising:
compensating for the recognition feature of the speech signal by using a neural network.

14. The speech processing method of claim 8, further comprising:
recognizing the attribute of the speaker based on the speech signal,
wherein the attribute represents at least one of information indicating the speaker, a language spoken by the speaker, an emotional expression included in the speech signal, and a character of a speaker wherein the character is assumed from the speech signal.

15. A non-transitory computer-readable storage medium storing instructions that when executed by a computer enable the computer to implement a method comprising:
calculating, using at least one processor, distribution of types of sounds included in a speech signal using a speech model configured to identify the types of sounds represented by the speech signal, wherein the types of sounds represent sound's classes clustered based on similarity of the sounds;
calculating, using the at least one processor, an acoustic diversity degree representing a degree of appearance of each of the types of sounds included in the speech signal;
calculating a recognition feature to recognize an attribute of the speaker;
compensating for the recognition feature so as to have a smaller bias of the types of sounds in the speech signal, using the at least one processor, by using the acoustic diversity degree value;
generating a recognition result based on the compensated recognition feature; and
transmitting the recognition result.

16. The non-transitory computer-readable storage medium according to claim 15, wherein the types of sounds are types of phonemes.

17. The non-transitory computer-readable storage medium according to claim 15, wherein the method further comprises:
calculating the degree of appearance of each of the types of sounds by using the speech model; and
calculating the acoustic diversity degree value by using the degree of appearance;
wherein the degree of appearance represents distribution of the types of sounds included in the speech signal.

18. The non-transitory computer-readable storage medium according to claim 15, wherein the method further comprises:
calculating the compensated recognition feature of the speech signal based on an acoustic diversity degree, a recognition feature of each of at least one first speech signal, and a recognition feature of each of at least one second speech signal.

19. The non-transitory computer-readable storage medium according to claim 18, wherein the first speech signal includes one or more speech signals obtained by segmenting the at least one second speech signal.

20. The non-transitory computer-readable storage medium according to claim 18, wherein the method further comprises:
compensating for the recognition feature of the speech signal by using a neural network.

21. The non-transitory computer-readable storage medium according to claim 15, wherein the method further comprises:
recognizing the attribute of the speaker based on the speech signal,
wherein the attribute represents at least one of information indicating the speaker, a language spoken by the speaker, an emotional expression included in the speech signal, and a character of a speaker wherein the character is assumed from the speech signal.

* * * * *